United States Patent Office  3,102,596
Patented Sept. 3, 1963

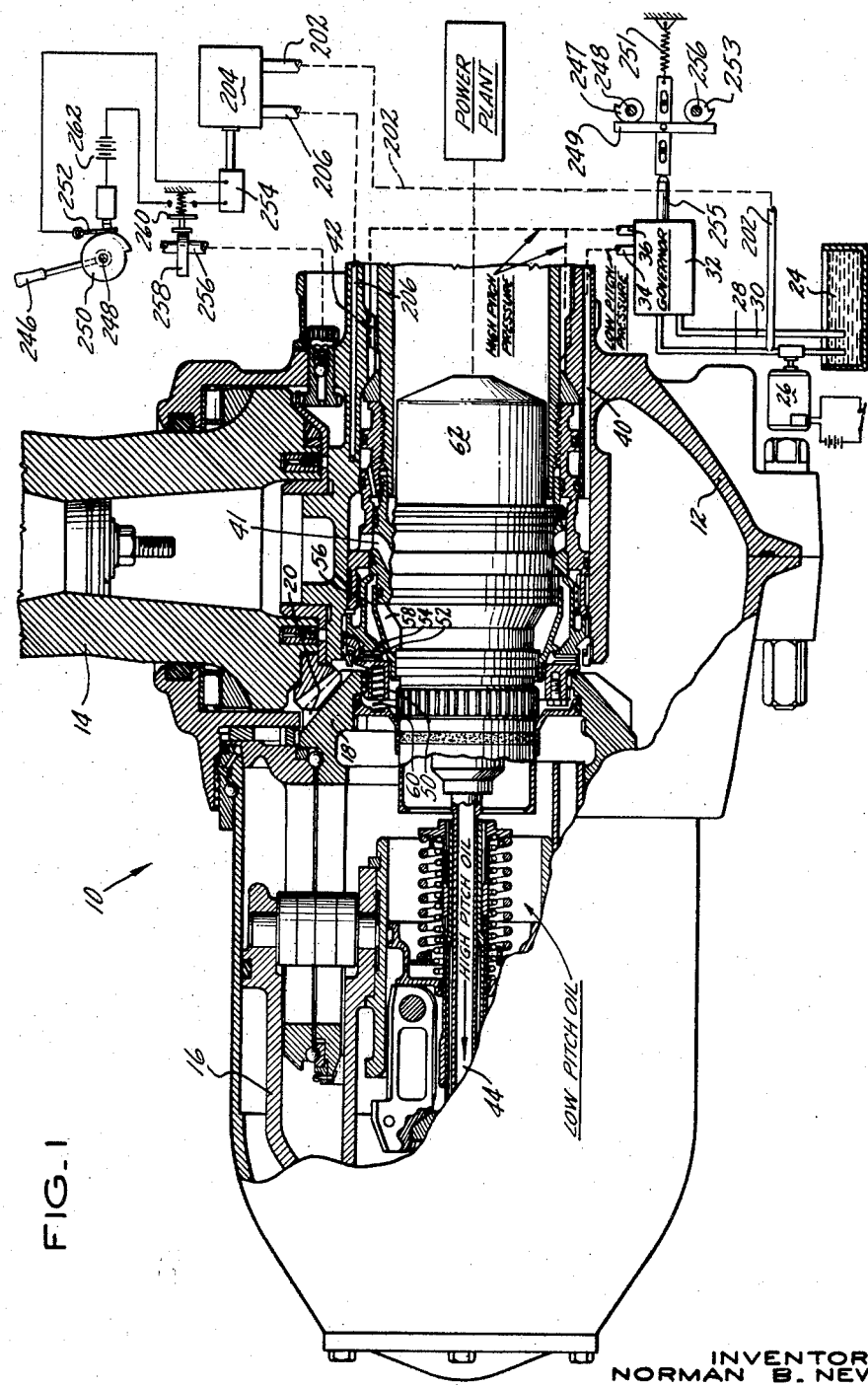

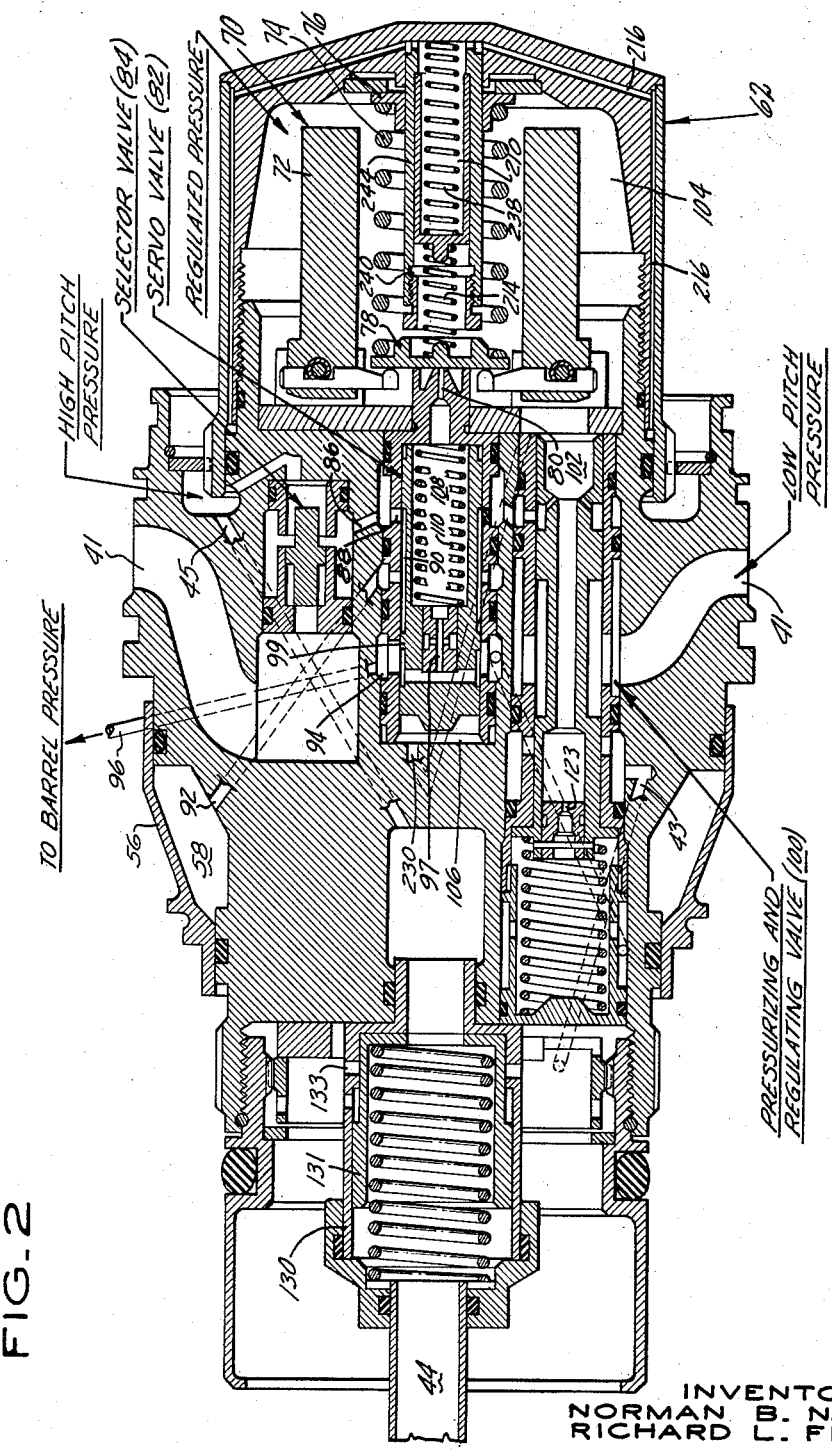

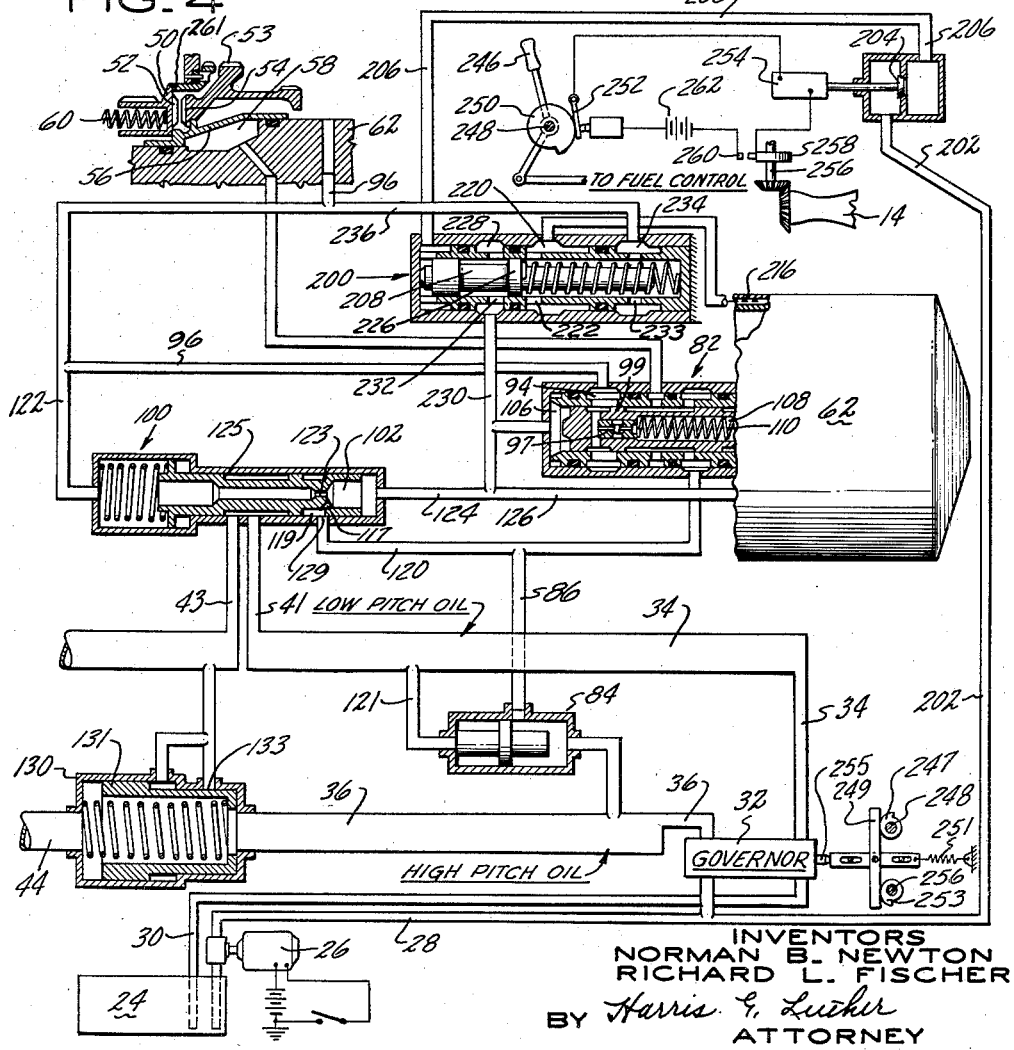

3,102,596
GOVERNED PITCH LOCK
Norman B. Newton, South Glastonbury, and Richard L. Fischer, Suffield, Conn., assignors to United Aircraft Corporation, East Hartford, Conn., a corporation of Delaware
Filed Feb. 23, 1960, Ser. No. 10,435
14 Claims. (Cl. 170—160.21)

This invention relates to variable pitch propellers and particularly to pitch lock systems for such propellers, and is an improvement on the pitch lock systems described and claimed in our application 767,308 filed October 15, 1958, now Patent No. 2,998,849 issued September 5, 1961.

An object of this invention is mechanism to reset the governor controlling the pitch lock system under selected conditions.

A further object is to retain the safety feature of the pitch lock in a selected low pitch range but to prevent operation of the pitch lock under some limited overspeed conditions that might be met in normal operation.

A still further object is mechanism which will retain a narrow r.p.m. operative band width on the pitch lock but permit speeds above that band width under selected condition without actuation of the pitch lock.

A still further object is mechanism under control of the propeller and engine control mechanism for rendering the pitch lock governor resetting mechanism operative and inoperative.

Other objects and advantages of this invention will be apparent from the following specifications and the accompanying drawings in which FIG. 1 is a partial cross section, partially schematic, of a controllable pitch propeller incorporating the invention;

FIG. 2 is an enlarged detailed cross section partially schematic of the governor and control valve elements.

FIG. 3 is a cross section, partially schematic, taken at approximately 90° from the section of FIG. 2 and showing the resetting mechanism control.

FIG. 4 is a schematic showing of the control elements and their interconnections.

Under certain conditions such as high speed landings, in which it may be desirable to reverse the propellers after the airplane is on the ground, it has been found that in the approach the propellers may slightly overspeed and actuate the pitch locks so as to prevent reversing when on the ground. While it is possible to completely disable the pitch lock system during such approach, such a system is dangerous because the propeller might dangerously overspeed during normal operation in the event of inadvertent actuation of the disabling system.

The present invention overcomes that danger and provides means for resetting the pitch lock governor to a high speed setting in the critical pitch range where the pitch is reducing under manual control from the pitch previously maintained by the governor. Inadvertent operation of this system will still provide a pitch lock operable at the higher speed.

Referring to FIG. 1 a propeller hub is generally indicated at 10 including a barrel 12 which supports a plurality of variable pitch blades 14. The blades 14 are mounted for pitch changing movement within the barrel 12. A pitch changing piston 16 is provided which is moved by hydraulic pressure in a forward or aft direction. This forward or aft movement is ultimately transformed into a rotary movement with a member 18 which includes teeth 20 connected to cooperating gear teeth on the base of the blade 14. A pitch changing mechanism includes a fluid reservoir 24 from which fluid is pumped by a motor-pump combination 26 through a line 28 and eventually returned to the reservoir via the line 30. A suitable governor 32 is provided and directs the flow of fluid under pressure to the low and high pitch lines 34 and 36, respectively. Low pitch pressure enters the passage 40 and by suitable connections including passages 41 and 43 is directed to the back or hub side of the pitch changing piston 16. On the other hand, the high pitch pressure oil is directed to the line 36 and through the splines 42 on the engine drive shaft and eventually to the central passage 44 in the propeller dome and then to the front side of the pitch changing piston 16. For further reference to similar pitch changing mechanisms, attention is invited to U.S. Patents Nos. 2,653,668 and 2,758,659 for further detail.

The rotating element or coordinating gear 18 of the propeller pitch changing mechanism has splined thereto a member 50—see FIG. 4—to rotate therewith and with the propeller blades and which carries at its forward face a ratchet-type tooth segment 52 and is slidable in a fore and aft direction. A cooperating tooth element is fixed to the barrel by splines 53 and has teeth 54 engageable between teeth 52 to provide a pitch lock for the propeller blades. The element 50 is movable fore and aft by means of a sleeve or piston 56 which forms a chamber 58 with the exterior of the housing of pitch lock control 62 to which chamber controlled fluid can be conducted. A pitch lock of this sort is more fully described in Patent No. 2,703,148 and the above-referred-to Fischer et al. application. The pitch lock is normally held disengaged by the pressure in the chamber 58 and is caused to engage when the pressure in the chamber 58 is drained therefrom in a manner described hereinafter. Under conditions in which the chamber 58 is drained springs 60 behind the pitch lock element 50 force the element 50 to the right. The overspeed control which regulates the position of the pitch lock is shown in full at 62.

Essentially there is no direct correlation between the pitch lock governor 62 and the main governor 32 since both mechanisms operate independently of each other. The pitch lock governor is set to function at a higher r.p.m. than the normal governor such that it functions to protect the propeller from any serious damage due to an overspeed should the blade go to a low blade angle.

The pitch lock control 62 is shown in detail in FIG. 2 along with the various regulating valves essential to the operation thereof. The pitch lock control assembly 62 comprises primarily an overspeed governor device 70 which includes a set of flyweights 72 biased by a spring 74. Spring 74 abuts against a fixed stop or abutment 76 at its right end and engages and carries at its left end a flapper 78 which can control the amount of flow through a variable orifice 80. The flapper 78 is free-floating and transversely centered only by spring 74 and needs no pivot support. The orifice 80 has the opening thereof varied by the flapper 78 so that it comprises a flapper valve which controls the position of a servo valve 82 which in turn controls the pressure of the fluid in the chamber 58 behind the pitch lock piston 56.

A shuttle valve or pressure selector valve 84 senses both high pitch and low pitch pressure and selects the higher of these two pressures to feed to the servo valve 82 via a passage 86. The passage 86 is connectable through a passage 88 and the channel 90 to a passage 92, schematically shown in dotted form, which connects with the chamber 58. Thus, high pressure can be fed through the aforementioned passages to the chamber 58, or low barrel pressure or drain may be connected to the passage 92 via the passage 94 which in turn connects to the passage 96 and then to the barrel or drain pressure inside of the barrel.

Thus, the servo valve can connect the pitch lock piston chamber 58 with either a high pressure or a substantially low pressure. Barrel pressure in this instance is just slightly above atmospheric.

A pressurizing, or sequencing, and regulating valve 100 is provided to establish a controlled pressure of predetermined value.

The functions of the sequencing and regulating valve 100 are two-fold. First, it prevents flow from the pump to the low pitch side of the pitch change piston 16 until the pitch lock is disengaged or at least pressure is available to disengage the pitch lock, and following this it acts as a pressure regulating valve to regulate and limit the pressure of the fluid fed to the pitch lock control 62.

The first function is necessary during starting and the second function minimizes undesirable effects of varying supply pressure on the operation of the flapper valve. The pressurizing and regulating valve 100 in essence passes a fluid of a predetermined regulated pressure from the chamber 102 into the chamber 104 which surrounds the flyweight 72. This regulated pressure is also conducted by suitable passages (see FIG. 4) to a chamber 106 on the left end of the servo valve 82. When an overspeed exists, the flyweights 72 move outwardly thereby raising the flapper 78 to permit regulated pressure from the chamber 104 to flow through the orifice 80 into the chamber 108 on the right-hand side of the servo valve 82. Thus, this balances with the regulated pressure existing in the chamber 106 on the left-hand end of the servo valve 82 to thereby balance the pressures on either side thereof. This causes the spring 110 to move the valve to the left to disconnect the pressure line 86 from the line 92 and chamber 58 and connect the pitch lock chamber 58 with low value barrel pressure via the passage 92 and the passages 94 and 96. The amount of opening of each of these passages is regulated by the amount of overspeed, but at no time are they both open to the line 92.

FIG. 4 is a schematic illustration of the valve arrangement and pitch lock shown in FIGS. 1 and 2. It is believed that a clearer understanding can be had from reference to this figure. Thus, for example, low pitch and high pitch pressure lines 34 and 36 are similar to those shown in FIG. 1. The remaining numbers utilized correspond to the elements shown in FIGS. 1 and 2. The shuttle or selector valve 84 senses both the pressures in the high and low pitch lines and selects the higher of the two to conduct this pressure to the supply line 86 leading to the servo valve 82. At the same time the shuttle valve 84 passes fluid at this selected high pressure to the pressurizing and regulating valve 100 via the line 120. This valve passes drain fluid out through the line 122 through a restriction 123 but passes a pressure at a predetermined level via the line 124 to both the chamber 106 on the left-hand side of the servo valve and also the chamber 104 which surrounds the flyweights via the passage 126 and also to a control valve 200 described in more detail hereinafter. As stated previously, the flapper 78 is capable of connecting the chamber 104 via the orifice 80 to the right-hand side 108 of the servo valve so as to equalize the pressure on that side with that existing in the chamber 106 on the left-hand side. Thus, the servo valve has its central element movable to a position whereby the passage 92 leading to pitch lock regulating chamber 58 is either connected with the supply line 86 or with barrel pressure via the line 96.

Mechanism is provided for resetting the governor 62 to a different speed setting under selected conditions and comprises in general a pressure line 202 leading to a solenoid controlled valve 204 which controls the application of pressure through a line 206 to the left-hand end of moveable plunger 208 of the valve 200 to force the plunger 208 to the right of the position shown in FIGS. 3 and 4. Valve 208 controls the pressure in chamber 210 in back of piston 212 and upon the application of pressure to chamber 210 will cause plunger 212 to move to the left from the position shown in FIG. 3 and compress spring 214 acting on plate 78 and thus increase the spring tension which must be overcome by the flyweights 72 in order to lift the valve plate 78 and uncover the orifice 80. Spring 214 which extends between the valve plate 78 and the plunger 212 assists spring 74 and together they provide the spring force which must be overcome by the flyweights 72 in order to move the valve plate 78 and thus determine the speed setting of the pitch lock governor. Chamber 210 on the right-hand side of plunger 212 is connected by passages 216 in the governor housing and a line 218, FIG. 3, with the chamber 220 of the valve 200. Chamber 220 is connected by port 222 with the valve chamber 224 and is in a position to be controlled by the land 226 of the plunger 208. Chamber 228 is connected by the line 230 with the controlled pressure appearing in chamber 106 at the left of the valve 82 and in the governor chamber 104 and is connected by port 232 with the plunger chamber 224 when the plunger 208 is moved to the right. Chamber 224 is connected by port 233, chamber 234, pipe 236 and conduit 96 with the drain pressure. As shown in FIG. 3, this connection is made through the drain chamber of the main servo valve 82. It will thus be seen that movement of the plunger 208 to the right will change the connection of lines 218, 216, and chamber 210 from drain line 96 connected to chamber 234 to the regulated pressure in the governor housing 104 connected to chamber 228 and port 232.

When the chamber 210 is connected with the barrel or drain pressure the pressure in chamber 104 which is the controlled pressure acting on the left-hand face of plunger 212 will compress spring 238 and move plunger 212 to the right to the position shown in FIG. 3, thus permitting spring 214 to expand and exert less force on the plate 78 and thus set the pitch lock governor at its normal speed setting. When controlled pressure is introduced into the chamber 210 the pressure on both sides of the piston 212 will then be equal and spring 238 being stronger than spring 214 will force the plunger 212 to the left and compress spring 214 to reset the governor to a higher speed setting. The movement of piston 212 is limited in one direction by the shoulder 240 and in the other direction by the shoulder 242. Cylinder 244 supporting the piston 212 is secured in fluid tight relation with the governor housing.

A control or coordinating lever 246 actuates a shaft 248 carrying cams or levers which in turn control the propeller and the flow of fuel to the turbine driving the propeller. The coordinating lever has three general ranges of control, one is the feathering control in which the lever controls the movement of the propeller into and out of feathered position from and to the normal high pitch position of the propeller. The second range is the alpha range in which the lever places the propeller under governor control and adjusts the governor speed setting as well as the flow of fuel to the turbine. The third range is the beta range in which the coordinating lever manually positions the propeller blades in accordance with the position of the coordinating lever. That is, in the beta range each position of the coordinating lever will have a corresponding blade position. It is this latter range in which the present control is effective.

Any suitable follow up mechanism may be used for positioning the blades in accordance with the lever position. One such mechanism is shown in Patent No. 2,840,169. Another is schematically shown in FIGS. 1 and 4 in which a cam 247 mounted on coordinating shaft 248 may act on one end of bar 249 which is slidable sideways and is held against the cam by spring 251. A cam 253 which acts on the other end of the bar, is fixed on shaft 256 which is geared to the propeller blades. Movement of bar 249 to the left can contact extension 255 of the pilot valve of governor 32 to position the pilot valve and thus move the blades. After movement of the extension 255 by cam 247 the blades will move cam 253 to return the extension 255 to its original position to restore equilibrium. Hence the blades will be positioned in accordance with the coordinating lever position.

When the control lever 246 is moved into the beta range a cam 250 carried by shaft 248 will close switch 252 and energize solenoid 254 to open valve 204 and admit high pressure through line 206 to the chamber at the left of plunger 208 to reset the pitch lock governor. A feed back shaft 265 geared to the propeller blades has a cam 258 thereon which will actuate a switch 260 in series with the switch 252 controlling the flow of energy from the energy source 262 to the solenoid 254. The switch 260 is closed in all blade positions above a blade pitch position of about 14° at which the movable and rotatable pitch lock member 50 is mechanically cammed out or held out of contact with the member carrying the teeth 54 by a cam 261 (FIGS. 1 and 4) fixed on the hub and coacting with projections on the rim of rotatable member 50 so that below this pitch angle of about 14 degrees the pitch lock cannot operate even if oil is drained from the chamber 58. For pitch angles below this 14 degrees switch 260 is opened by cam 258 and solenoid 254 de-energized so as to prevent flow of high pressure oil in line 206 and thus prevent resetting of the pitch lock governor, for, as the pitch lock has been disabled, the governor will no longer have any effect thereon. It will thus be seen that when the control lever 246 is moved into the beta range and the propeller blade is above 14 degrees that the solenoid 254 will be energized and the pitch lock governor will be reset.

It is not desirable to mechanically hold the pitch lock out of operation at blade angles greater than about 14° because under some normal flight conditions it is desirable to have the safety feature of the overspeed pitch lock at these low pitch angles to prevent overspeeding.

The above features become of particular importance in making a high speed landing in which the control lever 246 is moved into the beta position preparatory to reversing and the propeller blades are still above the angle at which the pitch lock is cammed out. The high airplane speed and the low propeller pitch will cause a temporary overspeeding of the propeller, which will be greater than the normal speed setting of the pitch lock governor, which is necessarily only slightly above a speed corresponding to normal engine speed, and will thus cause actuation of the pitch locks which in turn will prevent reversing of the propellers until after their pitch has been increased and their speed reduced. By providing this temporary resetting of the pitch lock governor, a limited controlled overspeed is permitted without locking the propeller blades so that upon landing the propeller will be in position for reversing.

Summing up, the operation of the structure is as follows:

During a static or nonoperating condition, chamber 58 will be void of fluid pressure and hence the pitch lock will be in engagement. It is impossible to set the blade at a lower pitch when the pitch lock is engaged, thus the sequencing function of valve 100 is to prevent the blade pitch changing mechanism from trying to move the blades toward a lower pitch until the pitch lock is disengaged. This is accomplished by the cooperating functions of these valves. For example, assume that during starting the pilot calls for a lower pitch setting or the propeller being underspeed the propeller governor calls for a lower pitch setting and directs propeller governor fluid to low pitch line 34. Since the chamber at the right end of the spool valve in valve 100 contains fluid under no pressure or low pressure fluid when first starting, the spring at its opposite end will urge said spool to the right. In this position the upper left-hand land 125 on the spool valve will block flow from the propeller governor and the low pitch line 34 and line 41 on the source side of valve 100 to the low pitch line 43 and pitch changing mechanism on the pitch changing motor side of valve 100 so that no pressure can reach the pitch changing piston 16. As the propeller speeds up and fluid pressure increases via line 34 and is introduced to shuttle valve 84, the free floating piston of shuttle valve 84 will be urged to the right connecting line 120 to line 34 and the pressure source and propeller governor via line 121. At the same time, line 34 is connected with line 86. Fluid through line 120 flows through valve 100 by way of an annulus 119 on the right end of the spool and its cooperating passageway 117 to chamber 102 and then to chamber 106 via line 124. Since flapper valve 78 is closed as the propeller is not overspeeding, the fluid pressure in chamber 106 will be higher than the fluid pressure on the right end of the piston which is drained, through a restricted orifice in the valve 108, to the barrel pressure thus generating sufficient force to overcome the force exerted by spring 110, and thus urging said piston to the right as shown in the drawing. In this manner, chamber 58 of the pitch lock piston is connected to line 86 via line 92 and hence allowing the fluid pressure to build up in chamber 58 to the governor side of valve 100. When this fluid pressure is at a predetermined value, the pitch lock will be disengaged.

As mentioned above, the fluid in line 34 upstream of valve 100 is blocked off from the pitch changing piston by said valve until pressure is available to disengage the pitch lock. When this occurs, valve 100 will be actuated by the build-up of pressure from governor line 34 and will be moved to the left to permit fluid to flow into line 43 downstream of valve 100 and connect the governor line 34 with the pitch changing mechanism via line 43.

As mentioned above, valve 100 regulates the pressure in line 124, to control the pressure applied to the governor of the pitch lock control 62 and its servo. This is accomplished by the spring acting on one end of the piston and fluid acting on the opposite end. The land 117 on the right end of the spool meters fluid across the port 129 formed at the end of line 120. The volume of fluid permitted to enter line 124 will be governed by the predetermined spring setting. Thus, for example, if the spring is designed to exert a force equivalent to 200 pounds per square inch in chamber 102, the fluid pressure in line 124 will be at 200 pounds per square inch. Should the pressure in line 124 go below 200 p.s.i., the spool will move to the right to uncover more of the port and conversely, when the pressure in line 124 goes above 200 p.s.i., then the spool will move to the left blocking off the port.

Of course, draining chamber 58, which will engage the pitch lock, upon an overspeed, is the main function of the overspeed governor. In essence, when the flyweights 72 sense an overspeed, centrifugal force will urge said flyweights outward lifting valve 78 away from its seat and allowing fluid in chamber 104 (which is at a higher pressure than that appearing on the chamber at the right end of the piston because of the drain connection 96 through restricted orifice 97) to ingress into valve 82. Since this opening 80 is substantially larger than the restriction 97 in the piston, more fluid can enter than leave, such that this increased flow and pressure will urge the piston to the left. When the piston is moved sufficiently to the left, line 86 is disconnected from line 92 and line 92 is connected to drain line 96 which in turn is connected with barrel pressure. Since barrel pressure is the pressure on the outside of piston 56 and is a lower pressure than the pressure in chamber 58, the fluid in chamber 58 will be directed out of said chamber allowing spring 60 to move member 50 to the right and the pitch lock to engage.

In coming in for a landing, the pilot will place the coordinating control in a flight idle position which is determined by a removable stop, not shown, in the path of the lever and in which the fuel is cut back and the propellers remain under the control of the propeller governor. The propellers will then taken a pitch position which loads the turbine driving the propeller sufficiently to limit the propeller and engine speed to that determined by the propeller pitch governor. Upon landing, the pilot will move the coordinating control beyond its stop which will position the coordinating control in the beta range and take the propeller out of governor control and start to reduce the propeller pitch from that maintained by the governors to the pitch determined by the position of the coordinating control. It is during this maneuver that the resetting mechanism of the present application comes into play. With the coordinating control in the beta range, the coordinating control switch is closed and, with the propeller blades in a pitch position, above a preselected low pitch at which the pitch lock is mechanically cammed out of operating position, the blade switch will be closed, so that the solenoid will be actuated and the reset mechanisms will reset the pitch lock governor to the higher speed setting. As the propeller pitch reduces from the governor controlled position to the low pitch selected by the coordinating control, its wind-milling effect will be increased and it will proceed to drive the turbine. If the airplane speed is too high and the approach too long, it is possible for the wind-milling propellers to increase the speed of the turbine, in spite of its appreciable inertia, to such an extent that the propeller speed may exceed the normal speed setting but not the higher speed setting of the pitch lock governor before the airplane speed is reduced sufficiently to prevent such overspeed. From a position in which the propellers and controls are in the flight idle position, it is possible to increase their pitch and increase the engine turbine power rapidly in the event of an aborted landing. From a position in which the control is in the beta range and the propeller pitch at a selected low pitch position, it is possible to move the propeller blades into a reverse pitch position and increase the power quickly in the event it is desired to use the reversing propellers as a brake after landing.

A surge valve 130 is provided in the system so as to limit the low pitch pressure. This is sometimes called the low pitch relief valve. The surge valve functions only when excessive decrease pitch pressure might prevail as during reversing. At this time the surge valve will be actuated by the low pitch pressure to move valve element or plunger 131 to the left and uncover port 133 and drain the excessive low pitch pressure into the draining high or increased pressure oil line.

Fluid under pressure is transferred through suitable transfer joints (not shown) from the stationary governor and pressure source to the lines 36, 40 and 202 in the rotating propeller.

As a result of this invention a mechanical pitch lock system is provided with a hydraulically controlled system. This hydraulically controlled system comprises a control valve (servo valve 82) which is accurately positioned by means of a flapper valve (78 and 80) which acts as a pilot valve. In this system the friction normally existing in a spool valve is virtually eliminated. In this way the pitch lock can be moved to a lock or unlock position in a very well-defined narrow r.p.m. band and the governor can be reset to permit limited overspeeding under special conditions.

The invention claimed is:

1. In a controllable pitch propeller, a pitch changing motor, a speed responsive governor controlling said motor, pitch lock means locking the blade against pitch reducing movement, speed responsive means independent of said governor and having a normal speed setting greater than the speed setting of said governor controlling said pitch lock means and manually controlled means manually selecting the propeller pitch and resetting said speed responsive means to a predetermined higher speed setting.

2. Mechanism as claimed in claim 1 including a power control means and means operably connected with said power control means, controlling said resetting means and disabling said governor.

3. Mechanism as claimed in claim 1 in which said speed responsive means include centrifugally actuated means, a main spring means opposing said centrifugally actuated means, auxiliary spring means having one end continuously assisting said main spring means, a hydraulically actuated plunger having two predetermined positions and coacting with the other end of said auxiliary spring means and determining the effect of said auxiliary spring means on said centrifugally actuated means.

4. Actuating means as claimed in claim 1 in which said speed responsive means comprises a housing, centrifugally actuated means in said housing, first and second spring means having one end opposing said centrifugally actuated means, a piston, a cylinder having one end open to the interior of said housing supported on said housing and enclosing said piston, the other end of said second spring means acting on one face of said piston, and said resetting means comprises a third spring means moving said piston in said cylinder.

5. Pitch lock actuating means for a controllable pitch propeller having a speed responsive pitch control governor and a pitch lock and comprising means urging said pitch lock into locking engagement, hydraulically actuated means holding said lock out of locking engagement, propeller speed responsive means independent of said speed responsive governor controlling said hydraulic means and having a normal speed setting above the speed setting of said governor, selectively operable means manually controlling the propeller, disabling said governor and resetting said speed responsive means to a predetermined higher speed setting.

6. Governor speed resetting means comprising a closed housing, centrifugally actuated means in said housing, a first and a second spring means opposing said centrifugally actuated means, a piston, a cylinder supported at one end on said housing and open to the interior of said housing at the other end and enclosing said piston, spaced stops in said cylinder limiting the movement of said piston in said cylinder, said second spring means acting on one face of said piston and a third spring means stronger than said second spring means acting on the other face of said piston, a valve, conduits connecting said one end of said cylinder with said valve, means supplying fluid under pressure to the interior of said housing and to said valve, means connecting said valve with a drain and means selectively moving said valve to selectively connect said one end of said cylinder with said pressure fluid on said drain to move said piston from one stop to the other to change the force of said second spring opposing said centrifugally actuated means.

7. Resetting means as claimed in claim 6 including a propeller hub, means supporting said housing and said valve in said hub for rotation therewith and non-rotatable means outside of said hub controlling said valve moving means.

8. In combination with an engine driven controllable pitch propeller having a speed responsive pitch control means, a pitch lock and coordinating control means, including means controlling the engine fuel flow and the propeller pitch control means, said coordinating means having a beta range in which the speed responsive means is disabled and the propeller blades are positioned in accordance with the position of said coordinating means, and constant speed alpha range in which the blades are positioned by said propeller speed responsive control, pitch lock control means comprising a governor activating said pitch lock upon speeds in excess of the governor speed setting, and means for resetting said governor to a higher speed setting, means activated by said coordinating control upon movement from said alpha range into said beta range for energizing said resetting means.

9. A combination as claimed in claim 8 including blade pitch responsive means for de-energizing said resetting means in pitch positions below a preselected pitch.

10. A combination as claimed in claim 9 including means actuated by said blades for mechanically disabling said pitch lock in pitch positions below said preselected pitch.

11. A combination as claimed in claim 8 in which said governor comprises centrifugally actuated means, first and second spring means opposing said centrifugally actuated means, a piston, stops limiting the movement of said piston, said second spring means acting on one face of said piston, said resetting means comprising means moving said piston against one of said stops to compress said second spring a preselected amount and increase the force opposing said centrifugally actuated means.

12. Pitch lock actuating means as claimed in claim 5 in which said speed responsive means includes a free-floating flapper-type valve plate and adjustable spring means urging said valve plate towards its seat and transversely centering said plate, and said resetting means includes means adjusting said spring means.

13. In combination with an engine driven controllable pitch propeller having a speed responsive pitch control means, a pitch lock, and coordinating control means, including means controlling the propeller pitch control means, pitch lock control means comprising a governor set to function at a higher speed than said speed responsive means and activating said pitch lock upon speeds in excess of the governor speed setting, and means for resetting said governor to a still higher speed setting, means activated by said coordinating control for energizing said resetting means and resetting said governor at said still higher speed setting and simultaneously performing a different operation on said pitch control means including manually selecting the propeller pitch.

14. Pitch lock actuating means for a controllable pitch propeller having a speed responsive pitch control governor and a pitch lock and comprising means urging said pitch lock into locking engagement, hydraulically actuated means holding said lock out of locking engagement, propeller speed responsive means independent of said speed responsive governor controlling said hydraulic means and having a normal speed setting, selectively operable means resetting said speed responsive means to a predetermined higher speed setting, said speed responsive means comprising a housing supported by said propeller and rotatable therewith, centrifugally actuated means in said housing, first and second spring means opposing said centrifugally actuated means, a piston, a cylinder supported on said housing, leaving one end open to the interior of said housing and enclosing said piston, spaced stops limiting the movement of said piston, said second spring means acting on one face of said piston and a third spring means stronger than said second spring means acting on the other face of said piston, means continuously supplying fluid under a selected pressure to the interior of said housing, said resetting means comprising means normally connecting said other piston face with drain and means selectively supplying said selected pressure to said other face of said piston to equalize the pressure on opposite sides of said piston so that said third spring will move said piston to the stop and increase the force of said second spring

References Cited in the file of this patent

UNITED STATES PATENTS

| | | |
|---|---|---|
| 2,616,507 | Greenland | Nov. 4, 1952 |
| 2,628,684 | Slatter | Feb. 17, 1953 |
| 2,703,148 | Pearl | Mar. 1, 1955 |
| 2,869,650 | Fairhurst | Jan. 20, 1959 |
| 2,876,784 | Adams | Mar. 10, 1959 |
| 2,909,366 | Logan | Oct. 29, 1959 |
| 2,920,633 | Shepherd | Jan. 12, 1960 |
| 2,992,687 | Brett et al. | July 18, 1961 |